(12) United States Patent
Khripin et al.

(10) Patent No.: US 10,087,314 B2
(45) Date of Patent: *Oct. 2, 2018

(54) FUNCTIONALIZED RUBBER COMPOSITION

(71) Applicant: Compagnie Generale des Etablissements Michelin, Clermont-Ferrand (FR)

(72) Inventors: Constantine Khripin, Simpsonville, SC (US); Etienne Munch, Clermont-Ferrand (FR); Anne-Frédérique Salit Salit, Riom (FR); Jessica McDowell, Greenville, SC (US); Xavier Saintigny, Greer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 102 days.

This patent is subject to a terminal disclaimer.

(21) Appl. No.: 15/199,250

(22) Filed: Jun. 30, 2016

(65) Prior Publication Data
US 2016/0312016 A1 Oct. 27, 2016

Related U.S. Application Data

(63) Continuation-in-part of application No. PCT/US2015/067613, filed on Dec. 28, 2015.

(60) Provisional application No. 62/096,921, filed on Dec. 26, 2014.

(51) Int. Cl.
| C08L 15/00 | (2006.01) |
| C08L 1/00 | (2006.01) |
| C08K 3/36 | (2006.01) |
| C08L 9/06 | (2006.01) |
| C08L 9/00 | (2006.01) |
| C08L 93/00 | (2006.01) |

(52) U.S. Cl.
CPC ............ C08L 15/00 (2013.01); B60C 1/0016 (2013.01); C08K 3/36 (2013.01); C08L 9/00 (2013.01); C08L 9/06 (2013.01); C08L 93/00 (2013.01); C08L 2205/06 (2013.01)

(58) Field of Classification Search
None
See application file for complete search history.

(56) References Cited

U.S. PATENT DOCUMENTS

| 2007/0037908 A1* | 2/2007 | Pille-Wolf | B60C 1/0016 524/270 |
| 2012/0016056 A1* | 1/2012 | Miyazaki | C08L 9/06 523/156 |
| 2013/0203940 A1* | 8/2013 | Soto | C08K 9/06 525/102 |
| 2015/0148447 A1* | 5/2015 | Takeda | B60C 1/0016 523/156 |

FOREIGN PATENT DOCUMENTS

| JP | 2011012131 A | * | 1/2011 | |
| WO | WO-2013161876 A1 | * | 10/2013 | ............ B60C 1/0016 |

* cited by examiner

Primary Examiner — Randy P Gulakowski
Assistant Examiner — Ha S Nguyen
(74) Attorney, Agent, or Firm — Frank J. Campigotto

(57) ABSTRACT

Rubber compositions having a modified rubber component selected from a modified polybutadiene rubber, a modified styrene-butadiene rubber, or combinations thereof, the modification being with a functional group having a hydrogen bond acceptor atom. Such functional group may be selected from a pyridine, a pyrrolidone, an ether, a ketone or an epoxide, the rubber composition having a Tg of between −80° C. and −110° C.

The rubber composition may include an efficient plasticizing resin, which when included in a mixture consisting of the modified rubber component and 67 phr of the efficient plasticizing resin, causes a Tg of the mixture to be at least 14° C. higher than the Tg of the modified rubber component. The rubber composition may described as having the hydrogen bond acceptor atom located at least two covalent bond lengths or alternatively three covalent bond lengths from a backbone of the modified rubber component.

21 Claims, No Drawings

FUNCTIONALIZED RUBBER COMPOSITION

This is a CIP of pending international patent application PCT/US15/67613 filed Dec. 28, 2015 that claimed the benefit of U.S. Provisional Application No. 62/096,921 filed on Dec. 26, 2014.

BACKGROUND OF THE INVENTION

Field of the Invention

This invention relates generally to rubber compositions and more particularly, to rubber compositions useful for making tires or semi-finished products for tires.

Description of the Related Art

Tire designers must often deal with conflicting requirements when they design a new tread for a tire. Tire consumers want to have tires that grip well in the snow as well as on dry and wet roads, they want low rolling resistance tires that require tires be designed with low hysteresis and they want tires with good wear properties so they can run the tires for many miles without wearing them out.

Improving grip and wear at the same time remains a constant challenge to the tire designer. It is well known in the industry that tire designers often compromise on certain tire performance characteristics since often each improvement to one characteristic is offset by a decline in another tire performance characteristic. Such is the case for tire wear and wet traction. There is a compromise that tire designers must reach since when they try to achieve an improvement in the wear properties of the tire there is often a decrease in the braking performance of the tire. For example it is known that adding a polybutadiene to a rubber composition will result in improved wear but it is know that it also results in a decrease in traction. Therefore, tire designers are looking for improvements to their designs that allow them to break this compromise, i.e., achieve an improvement in wear without a corresponding decrease in another tire property such as braking.

New materials are useful for breaking compromises and tire designers are developing new materials that can be successfully integrated into rubber compositions that are used to build tires.

SUMMARY OF THE DISCLOSURE

Particular embodiments of the disclosure provide rubber compositions, rubber articles including tire treads and methods for making such rubber articles. An embodiment includes a rubber composition that is based up a cross-linkable elastomer composition, the cross-linkable elastomer composition having, per 100 parts by weight of rubber (phr), a modified rubber component selected from a modified polybutadiene rubber, a modified styrene-butadiene rubber, or combinations thereof. In certain embodiments the modified rubber component has been modified with a functional group having a hydrogen bond acceptor atom, the functional group selected from the group consisting of a pyridine, a pyrrolidone, an ether, a ketone and an epoxide and has a Tg of between −80° C. and −110° C.

Such rubber compositions may additionally include between 30 phr and 130 phr of an efficient plasticizing resin, wherein the efficient plasticizing resin is, when included in a mixture consisting of the modified rubber component and 67 phr of the efficient plasticizing resin, causes a Tg of the mixture to be at least 14° C. higher than the Tg of the modified rubber component and wherein the efficient plasticizing resin has a hydrogen bond donor group. The rubber compositions also include a reinforcement filler and a curing system.

It may also be that rubber composition may be described as having the hydrogen bond acceptor atom located at least two covalent bond lengths or alternatively three covalent bond lengths from a backbone of the modified rubber component.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include treads and tires having such treads that have improved wear characteristics while maintaining or even improving their traction, i.e., improved braking performance, especially wet traction. This improvement in wear and traction has been achieved by forming unique tire treads from a rubber composition that includes blending a rubber component having a low glass transition temperature (Tg) with an efficient resin that results in a rubber composition having a Tg within a range suitable for all-weather tires, summer tires and/or winter tires. Such tires are particularly suitable for use on passenger cars and/or light trucks and while certain embodiments are limited to such uses, other embodiments are broader and may include tires useful for other vehicles including heavy trucks, aircraft and so forth.

In other embodiments of the rubber compositions disclosed herein, an improvement in traction of a tread can be achieved without sacrificing the improvement in wear. It has been found that by combining a low-Tg modified rubber component that is selected from a modified styrene-butadiene rubber (SBR), a modified polybutadiene rubber (BR) or combinations thereof with a second rubber component selected from BR and/or SBR and with an efficient plasticizing resin that wet traction is improved without a compromise in the wear property. Surprisingly it has been discovered that adding the second rubber component SBR/BR to the rubber composition does not decrease the glass transition temperature (Tg) of the resulting rubber composition but actually increases it even though, for example, BR has a very low Tg, e.g., less than −90° C. In particular embodiments the modified rubber composition is functionalized with an epoxide so that the modified rubber component is selected from the group consisting of an epoxidized polybutadiene rubber (eBR), an epoxidized styrene-butadiene rubber (eSBR), or combinations thereof.

The inventors have investigated useful functional groups that can be used to modify the low-Tg modified rubber components disclosed herein. The inventors have recognized that the interaction between the efficient plasticizing resins that are added to the rubber compositions and the low-Tg modified rubber components contribute to the surprising results that have been achieved with the disclosed rubber compositions. More particularly, examples of useful functional groups include a pyridine, a pyrrolidone, a cyclic ether, a cyclic ketone, an epoxide, a non-cyclic ether, a non-cyclic ketone and a sulfone. These functional groups all include a hydrogen bond acceptor atom that can form a hydrogen bond with the plasticizing resin having a hydrogen bond donor group, such as a hydroxyl group, a phenol, a diphenylamine, a polyamide, a carboxylic acid and an aromatic amine.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As is generally known, a tire tread includes the road-contacting portion of a vehicle tire that extends circumferentially about the tire. It is designed to provide the handling characteristics required by the vehicle; e.g., traction, dry braking, wet braking, cornering and so forth—all preferably being provided with a minimum amount of generated noise and at low rolling resistance.

Treads of the type disclosed herein include tread elements, the structural features of the tread that contact the ground. Such structural features may be of any type or shape, examples of which include tread blocks and tread ribs. Tread blocks have a perimeter defined by one or more grooves that create an isolated structure in the tread while a rib runs substantially in the longitudinal (circumferential) direction and is not interrupted by grooves that run in the substantially lateral (axial) direction or any other grooves that are oblique thereto. The radial (depth) direction is perpendicular to the lateral direction.

It is recognized that treads may be formed from only one rubber composition or in two or more layers of differing rubber compositions, e.g., a cap and base construction. In a cap and base construction, the cap portion of the tread is made of one rubber composition that is designed for contract with the road. The cap is supported on the base portion of the tread, the base portion made of different rubber composition. In particular embodiments of the present invention the entire tread may be made from the rubber compositions disclosed herein while in other embodiments only the cap portions of the tread may be made from such rubber compositions.

In other embodiments it is recognized that the contact surface of the tread elements, i.e., that portion of the tread element that contacts the road, may be formed totally and/or only partially from the rubber compositions disclosed herein. In particular embodiments the tread block, for example, may be formed as a composite of laterally layered rubber compositions such that at least one lateral layer of a tread block is of the rubber compositions disclosed herein and another lateral layer of a tread block is of an alternative rubber composition. In particular embodiments of tread constructions, at least 80% of the total contact surface area of the tread is formed solely from the rubber compositions disclosed herein. The total contact surface area of the tread is the total surface area of all the radially outermost faces of the tread elements that are adapted for making contact with the road.

Particular embodiments of the rubber compositions that are disclosed herein and that are useful for treads include a modified polybutadiene rubber (BR), a modified styrene-butadiene rubber (SBR) or combinations thereof that have been modified with a functional group that contains a heteroatom selected from oxygen, nitrogen and/or silicon.

Such useful rubbers may be characterized as having a low glass transition temperature (Tg), i.e., a Tg of between −80° C. and −110° C. or alternatively between −80° C. and −105° C., between −85° C. and −105° C. or between −90° C. and −100° C. The glass transition temperatures of such elastomers may be measured by differential scanning calorimetry (DSC) in accordance with ASTM D3418.

Without limiting the invention, it is thought that the modification of the elastomer with such a heteroatom may provide an opportunity for the elastomer to form a hydrogen bonding relationship with a properly selected resin. As will be further disclosed below, such properly selected resins are efficient plasticizing resins—those resins that when mixed in an amount of 67 phr with just the low Tg modified rubber component, results in a mixture having a Tg that is at least 14° C. higher than the Tg of the modified rubber component.

As is known in the art, a proton donor/acceptor relationship provides hydrogen bonding which may be illustrated as D-H - - - A, where D is the proton donor and A is the proton acceptor. While often the donor will interact with just one acceptor, it is also possible for the donor to interact with multiple acceptors simultaneously. Such systems are often referred to as bifurcated or trifurcated arrangements.

As is known, hydrogen bonding formation is governed by the equation:

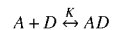

$$A + D \overset{K}{\leftrightarrow} AD$$

where A is the acceptor, D is the donor and K is the equilibrium constant. The equilibrium constant K is defined as the ratio of concentrations at equilibrium:

$$K = \frac{[AD]}{[A][D]}$$

where the brackets [ ] indicate, as is typical, the concentration.

In particular embodiments of the systems described herein, the proton donor may be provided by the elastomer or alternatively it may be provided by the resin. In particular embodiments of the system, the hydrogen bond acceptor is located on the modified low-Tg modified rubber component and the hydrogen bond donor is located on the resin. For example if the resin has readily available OH groups, as is the case of terpene phenolic resins, then the resin would act as the proton donor and the elastomer would be functionalized to act as the proton acceptor, having been modified, for example, with an epoxide moiety or with a nitrile moiety or with a pyridine, a pyrrolidone, a cyclic ether, a cyclic ketone, an epoxide, a non-cyclic ether, a non-cyclic ketone or a sulfone. As another example, if the resin has epoxide groups, as in the case of epoxide resins, then the resin would act as the proton acceptor and the elastomer would be functionalized to act as the proton donor, having been modified, for example with a silanol moiety. Such elastomers and resins are well known in the art.

Particular embodiments of the modified rubber compositions that are disclosed herein and that are useful for treads include those that have been modified by functionalizing the backbone or the branches of the elastomers. As noted, such modifications of elastomers are well known and may include, for example, modifying the elastomers with silanol or polysiloxane as may be described, for example, in U.S.

Pat. No. 6,013,718. Other examples include those having alkoxysilane groups as described in U.S. Pat. No. 5,977,238, carboxylic groups as described in U.S. Pat. No. 6,815,473 or polyether groups as described in U.S. Pat. No. 6,503,973, all of these cited patents being fully incorporated herein by reference.

It should be noted that the functional groups typically added in the past to the these elastomers such as alkoxysilane groups, carboxylic acid groups and so forth are intended to interact with the reinforcement fillers such as carbon black and silica. As such the functionalization level of such elastomers may be lower than the functionalization level of the modified low-Tg rubber components discussed herein, often being less than 1 mol % or even less than as 0.1 mol %. The modifications to the low-Tg rubber components useful for particular embodiments of the rubber compositions disclosed herein and intended to hydrogen bond with the plasticizing resin and not the reinforcement filler are modified so that the functional group content of the modified rubber component is at least 1 mol % or alternatively at least 4%, between 1 mol % and 25 mol %, between 4 mol % and 15 mol %, between 5 mol % and 15 mol %, between 2 mol % and 18 mol %, between 3 mol % and 18 mol %, between 5 mol % and 15 mol %, between 5 mol % and 12 mol %, between 8 mol % and 15 mol % or between 8 mol % and 20 mol %. If the content is too high, the polymer may become too polar and processability issues may arise. If the content is too low, then the desired effects will not be realized.

It may be noted that particular embodiments of the rubber compositions disclosed herein are limited to those having only the epoxidized SBR and epoxidized BR, either singly or combination with each other, as the low Tg modified rubber component. However, such limitations for these particular embodiments are not meant to limit the invention disclosed herein to only such embodiments.

Therefore particular embodiments of the disclosed rubber compositions that are useful for treads as well as other rubber articles include a modified rubber component selected from a modified polybutadiene rubber, a modified styrene-butadiene rubber or combinations thereof, wherein the modified rubber component has been modified with a functional group having a hydrogen bond acceptor atom, the functional group selected from the group consisting of a pyridine, a pyrrolidone, an ether, a ketone and an epoxide and wherein the modified rubber component has a Tg of between −80° C. and −110° C.

Alternative embodiments include the functional group to be selected from the group consisting of a pyridine, a pyrrolidone, a cyclic ether and a cyclic ketone or alternatively from the group consisting of an epoxide, a non-cyclic ketone and a sulfone. Other embodiments may include just one of these functional groups or alternatively any grouping of one or more of them.

The functional groups suitable for modifying the low-Tg modified rubber component of the disclosed rubber compositions were selected because of their ability to achieve strong hydrogen bonds between the modified rubber component having hydrogen bonding acceptor atom and the plasticizing resin having a hydrogen bonding donor group. Hydrogen bond acceptors are chemical groups containing a negatively charged atom such as oxygen or nitrogen, and a delocalized positive charge, so that the group is capable of bonding to a positively charged hydrogen but does not itself contain a positively charged hydrogen capable of creating substantial hydrogen bonds. Examples are ketones, pyridines, ethers and so forth.

Hydrogen bond donors are chemical groups containing positively charged hydrogen capable of creating substantial hydrogen bonds. The negative charge is preferably delocalized to limit the ability of the donor to accept hydrogen bonds. An example of a donor is a phenol, where the negative charge is delocalized on the benzene ring. Another example is an alcohol, where the negative charge is not delocalized.

In their experiments, the inventors realized that the stronger the hydrogen bond was between the resin and the low-Tg modified elastomer, the better the resin was able to raise the Tg of the resulting rubber composition, which is an indicator of whether the resin is an efficient plasticizing resin as described below. That is, the stronger this hydrogen bond between the functional group and the resin can be made, then the higher the efficiency may be of the plasticizing resin in raising the Tg of the rubber composition that includes the low-Tg modified rubber component and the efficient plasticizing resin.

One aspect of the work that resulted in particular embodiments of the rubber compositions disclosed herein was to identify modified elastomers having functional groups that would form a stronger hydrogen bond with the resin. It was recognized that if the hydrogen bond acceptor atom were to be located at a greater distance from the backbone of the polymer then the hydrogen bond may be stronger.

As is known, the backbone or the main chain of a polymer is the continuous, nonintersecting path of covalently bonded atoms that create the continuous chain of the polymer molecule. It is the linear chain to which all other chains may be regarded as being pendant. As the hydrogen bond acceptor moves further away from the backbone, it is able to form a stronger hydrogen bond with the resin having a hydrogen bonding donor group. If there is a choice of pathway, the pathway that is longest will prevail; e.g., if there is a ring embedded in the pathway with two atoms of the ring along one path and three atoms of the ring along the other path, then the three atoms will count as the backbone and the two atoms will be considered pendent thereto.

Those skilled in the art can fully comprehend how to determine the structure of a molecule using NMR analysis and such explanation is not necessary herein. An example of an NMR technique useful for determining the microstructure can be found below.

One depiction of an example of a functionalized polymer is as follows:

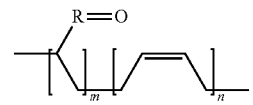

In this scheme, the polymer backbone consists of various repeat units that are ethylene and cis-butadiene. Some of the repeat units (mole fraction m) bear a functional group with oxygen as the hydrogen bond acceptor atom. The size of the R group provides a measurement of the number of covalent bonds that are between the backbone of the polymer the hydrogen bond acceptor atom and is a predictor of the strength of the hydrogen bond that can be formed with the resin. The mole fraction of each of the repeating units is expressed as m and n respectively.

Therefore, in particular embodiments, the configuration of the functional group on the chain of the modified polybutadiene or styrene-butadiene rubber component is such that the hydrogen bond acceptor atom is located at least two covalent bond lengths from the backbone of the polymer or alternatively at least three covalent bond lengths from the backbone of the polymer. Such an arrangement may provide a much more robust hydrogen bond with the plasticizing resin resulting in the benefit of the higher Tg of the rubber composition.

The following table provides a selection of functionalized elastomers having functionalities with hydrogen donor atoms having varying numbers of covalent bonds between them and their backbone.

TABLE A

Modified Polymer Characteristics

| Structure | Bonds N | ΔH, kcal/Mol | K, $M^{-1}$ |
|---|---|---|---|
| *Ketone Functional Group* | | | |
| [ketone structure] | 1 | 4.4 | 1.2 |
| [ketone structure with H₃C groups] | 2 | 5 | 0.9 |
| [pyrrolidinone structure] | 3 | 10.5 | 85 |
| [ketone with sulfur linker structure] | 6 | 8.0 | 7 |
| *Ethers and Pyridines* | | | |
| [ether structure] | 1 | NB | NB |
| [pyridine structure, 2-position] | 2 | 8.7 | 28 |
| [pyridine structure, different position] | 4 | 6.5 | 7.4 |

In each case, m=0.1 and n=0.9 reflecting a functionality content of 10 mol %. N is the number of covalent bonds between the backbone of the polymer and the hydrogen donor atom. ΔH is the bond enthalpy in kcal/mol and K is the association constant in $M^{-1}$.

The bond enthalpy and association constant were determined in known way. First a molecular model was constructed containing the polymer and resin molecules using the commercially available Materials Studio suite (Biovia, Inc.). The polymer molecules were modified with the functional group shown at a concentration of 10 mol %; i.e., m=0.1. In all cases the same resin was modeled with each of the modified polymers, a terpene phenolic resin having hydroxyls as the hydrogen acceptor functionality.

The model was then subjected to a molecular dynamics (MD) simulation using the commercially available COMPASS force field to describe the molecular interactions. Molecular dynamics is well known and is a computer simulation method for studying the movements of atoms and molecules. The atoms and molecules interact in the simulation for a determined period of time to generate a prediction of the time evolution of a system of the interacting atoms and molecules.

During the simulation, the association constant K between the resin and the polymer may be observed. It is understood that the higher the association constant is, the more favorable is the hydrogen bonding strength. By carrying out the MD at various temperatures, the bond enthalpy was derived using Arrhenius law.

It has been determined that an association constant of at least 7 $M^{-1}$ provides a suitable hydrogen bonding strength. Reviewing the results shown in Table A, it can be seen that if the covalent bond length N for those polymers functionalized with a ketone is not at least 3, there is not sufficient bonding strength. For the ester functionalized polymer bonded to the backbone with only one covalent bond length was incapable of bonding to the resin and was not bondable (NB). For the pyridine functionalized polymers, a covalent bond length of two was enough to provide a suitable hydrogen bond strength.

It should be noted that polymers functionalized with the epoxide group have excellent hydrogen bonding with a covalent bond length of one bond between the backbone and the oxygen atom.

It should be noted that the molecules shown in Table A are synthesized by known methods and the teaching of such methods is not necessary herein since those skilled in the art are well able to synthesize functionalized polymers. However, it is further noted that the synthesis of a selection of these molecules may be found as follows. For the first three molecules in the first column of Table A, the syntheses are taught respectively in 1) By treating dienic polymers with nitrous oxide, see K. A. Dubkov, et al., "New Reaction for the Preparation of Liquid Rubber," December 2005, pp. 2510-2520, 2006; 2) By radical copolymerization of vinyl methyl ketone and 1,3 butadiene, see G. Odian, Principles of Polymerization, John Wiley & Sons, 2004 and 3) By radical copolymerization of n-vinyl pyrrolidone and 1,3 butadiene, see G. Odian, Principles of polymerization. John Wiley & Sons, 2004. 4) By thiol-ene click reaction of 2-mercapto 3-butanone and polybutadiene with 38 mol % of 1,2 butadiene units N. Brummelhuis, C. Diehl, and H. Schlaad, "Thiol-Ene Modification of 1,2-Polybutadiene Using UV Light or Sunlight UV Light or Sunlight," vol. 41, November, pp. 9946-9947, 2008. For those in the second column, the synthesis may be found in 1) By free radical copolymerization of vinyl methyl ether and 1,3 butadiene; 2) By radical copolymerization of n-vinyl pyrrolidone and 1,3 butadiene, see G. Odian, Principles of polymerization. John Wiley & Sons, 2004 and 3) Synthesis by free radical copolymerization of 1,3 butadiene and 4-vinylpyridine, commercially available as Gentac from Omnova, Inc.

Particular embodiments of the rubber compositions that are disclosed herein and that are useful for treads include an epoxidized rubber component that is selected from an epoxidized polybutadiene rubber (eBR), an epoxidized styrene-butadiene rubber (eSBR) or combinations thereof. These useful rubbers may be further characterized as having a low glass transition temperature (Tg), i.e., a Tg of between −80° C. and −110° C. or alternatively between −80° C. and −105° C., between −85° C. and −105° C. or between −90° C. and −100° C. The glass transition temperatures of epoxidized elastomers may be measured by differential scanning calorimetry (DSC) in accordance with ASTM D3418.

Epoxidized rubbers such as eBR and eSBR are well known and may be obtained, as is known to those skilled in the art, by processes based on chlorohydrin or bromohydrin or processes based on hydrogen peroxides, alkyl hyperoxides or peracids (such as peracetic acid or performic acid).

To obtain the targeted technical effect, the epoxidized rubber includes between 1 mol % and 25 mol % of the epoxy functionality or alternatively between 2 mol % and 25 mol %, between 2 mol % and 18 mol %, between 3 mol % and 18 mol %, between 5 mol % and 25 mol %, between 5 mol % and 18 mol %, between 8 mol % and 15 mol % or between 8 mol % and 20 mol %. Since the Tg of the rubber increases with increasing epoxy functionality, greater than 25 mol % impacts the desired wear properties of the treads disclosed herein and less than the 1 mol % impacts the resin selection and content of the resulting rubber composition. The epoxy functionality by mole percent can be determined in known way through NMR analysis.

eSBR is a copolymer of styrene and butadiene that has been functionalized with an epoxy functional group as explained above. The SBR may be manufactured by any of the known processes including the emulsion process producing E-SBR and the solution process producing S-SBR.

The microstructure of the eSBR is typically described in terms of the amount of bound styrene and the form of the butadiene portion of the polymer. Looking first at the amount of bound styrene, since the Tg of the eSBR increases as the bound styrene content increases it is necessary to limit the amount of bound styrene to an amount that still provides the required low Tg of the elastomer. Particular embodiments of the present invention may utilize an SBR having a bound styrene content, for example, of between 3 wt % and 30 wt % or alternatively between 3 wt % and 25 wt % or between 5 wt % and 20 wt % bound styrene.

Considering the butadiene portion of the copolymer, the butadiene portion is made up of three forms because of the double bond present in that butadiene portion. The three forms are the cis-1,4, trans-1,4 and vinyl-1,2 forms. Higher levels of the cis-form may typically provide a lower Tg while increasing levels of the vinyl-form may typically increase the Tg. SBR materials suitable for use as the low Tg SBR may be described, for example, as having a vinyl-1,2-bond content of between 4 mol % and 30 mol % or alternatively, between 4 mol % and 25 mol % or between 4 mol % and 20 mol %.

Of course it is a balancing of the styrene content and the microstructure of the butadiene portion of the eSBR that provides the physical properties desired of the material, including the low Tg. While the microstructure and styrene content of the eSBR can be adjusted to provide improvements to the properties of the elastomer, the invention requires that the low Tg eSBR elastomers that are included in the suitable rubber compositions disclosed herein fall within the claimed glass transition range.

eBR is a homopolymer of butadiene units that have polymerized and that has then been functionalized with an epoxy functional group as explained above. As in the case of the butadiene portion of the eSBR, the eBR Tg decreases with increased levels of the cis-form microstructure and increases with increased levels of the vinyl-form. In particular embodiments, for example, the cis-form content of the eBR is in excess of 50 mol %. While the microstructure of the eBR can be adjusted to provide improvements to the properties of the elastomer, the invention requires that the low Tg eBR elastomers that are included in the suitable rubber compositions disclosed herein fall within the claimed glass transition range.

Particular embodiments of the suitable rubber compositions useful for tire treads disclosed herein include between 70 phr and 100 phr of the low Tg epoxidized rubber component. Alternatively the rubber compositions may include between 80 phr and 100 phr of the low Tg epoxidized rubber component, between 85 phr and 100 phr, between 90 phr and 100 phr or greater than 90 phr of the rubber component. Particular embodiments may include less than 100 phr of the low Tg epoxidized rubber component such as between 80 phr and 95 phr, between 85 phr and 95 phr or between 90 phr and 95 phr. Particular embodiments include 100 phr of the low Tg epoxidized rubber component.

Alternatively, in those particular embodiments wherein the rubber composition includes a second rubber component of a polybutadiene (BR) and/or styrene-butadiene rubber (SBR) rubber in addition to the modified rubber component and the efficient plasticizing resin, then the most basic requirement of such embodiments merely requires that some amount of both the low Tg modified rubber component and the BR and/or SBR component be included in the rubber composition. Alternatively the rubber composition may include between 10 phr and 95 phr of the modified rubber component, or between 50 phr and 95 phr, between 25 phr and 95 phr, between 10 phr and 90 phr, between 50 phr and 90 phr, between 25 phr and 90 phr, between 10 phr and less than 70 phr, between 25 phr and less than 70 phr or between 50 phr and less than 70 phr of the modified rubber component. Likewise such rubber compositions may alternatively include between 5 phr and 90 phr of the second rubber component of BR and/or SBR or between 5 phr and 50 phr, between 5 phr and 75 phr, between 10 phr and 90 phr, between 10 phr and 50 phr, between 10 phr and 75 phr, between greater than 30 phr and 90 phr, between greater than 30 phr and 75 phr or between greater than 30 phr and 50 phr of the BR and/or SBR rubber second rubber component.

Particular embodiments of those that include both the modified rubber component and the second rubber component of SBR and/or BR rubber, the SBR/BR second rubber component may include only BR, only SBR or combinations of both BR and SBR in any ratio. In particular embodiments of the rubber compositions that include the SBR/BR second rubber component, optionally there can be no natural rubber (NR) as an additional rubber component included in the rubber compositions or alternatively no more than 5 phr of NR. In other embodiments there optionally can be no isoprene/styrene copolymers (SIR) and isoprene/butadiene/styrene copolymers (SBIR) as additional rubber components, either separately or in combination with one another or alternatively no more than 5 phr of any one of them or combination thereof. The presence of such additional rubber components may interfere with or marginalize the desired properties being sought in particular embodiments. Optionally, in particular embodiments, there can be no other additional rubber component other than the epoxidized rubber component and the SBR and/or BR second rubber component.

Of course as indicated above, particular embodiments of the rubber compositions disclosed herein may be limited to having only the eBR and/or eSBR as the low Tg modified rubber component.

Particular embodiments of the suitable rubber compositions disclosed herein may include as the low Tg epoxidized rubber component only eBR, only eSBR or combinations of both eBR and SBR in any ratio. In those embodiments that include both eBR and eSBR, some embodiments may be limited to including eBR in a majority amount or alternatively in amount greater than 60% of the total phr of the eBR and the SBR in the rubber composition or at least 75% or at least 90% of such total phr.

In addition to the low Tg epoxidized eBR and/or eSBR, particular embodiments of the rubber compositions disclosed herein may include one or more additional diene rubber components. Such diene elastomers are understood to be those elastomers resulting at least in part, i.e., a homopolymer or a copolymer, from diene monomers, i.e., monomers having two double carbon-carbon bonds, whether conjugated or not.

While particular embodiments of the rubber compositions disclosed herein include only the low Tg epoxidized rubber components discussed above, others may additionally include such diene elastomers capped at an amount of no more than 30 phr or alternatively, no more than 25 phr, no more than 20 phr, no more than 10 phr or no more than 5 phr of such additional diene elastomers. Particular embodiments of such rubber compositions may include a lower limit for each of these caps of 0 phr and others may include a lower limit of 5 phr of such additional diene elastomers.

These additional diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %. Particular embodiments of the present invention exclude any additional diene elastomers that are essentially saturated.

Suitable elastomers that may be included as additional elastomers in the rubber compositions disclosed herein in addition to the eBR and eSBR include, for example, one or more highly unsaturated elastomers such as polybutadienes (BR), polyisoprenes (IR), natural rubber (NR), butadiene copolymers, isoprene copolymers and mixtures of these elastomers. Such copolymers include, for example, butadiene/styrene copolymers (SBR), isoprene/butadiene copolymers (BIR), isoprene/styrene copolymers (SIR) and isoprene/butadiene/styrene copolymers (SBIR). Particular embodiments of the present invention are limited only to highly unsaturated diene elastomers as useful additional elastomers.

In addition to the elastomers described above, particular embodiments of the present invention include an efficient plasticizing resin. An efficient plasticizing resin is one that when mixed in an amount of 67 phr with just the low Tg epoxidized rubber component, results in a mixture having a Tg that is at least 14° C. higher than the Tg of the epoxidized rubber component. Such plasticizing resins are typically compatible with the rubber composition; that is, they are miscible with the rubber composition. If the plasticizing resin is not compatible, then a determination of the Tg using DSC in accordance with ASTM D3418 will have Tg peaks representing the rubber blend as well as the resin itself. If the resin is compatible, then there will be but one peak for the rubber composition.

Table 1 demonstrates how some plasticizing resins are efficient plasticizing resins for some levels of epoxy functionality but not at others. Some are not efficient plasticizing resins with BR having no epoxy functionality but become efficient with at least some of the epoxy functionality levels.

TABLE 1

Change in Tg of BR at Various Epoxy Functionality Levels

| Plasticizer | | | Change in Tg of BR Mixture with 67 phr of Plasticizer, ° C. | | | |
|---|---|---|---|---|---|---|
| Name | Type | Tg, ° C. | 0 mol % X | 5 mol % X | 12.5 mol % X | 20 mol % X |
| BPH | antioxidant | 16 | | | 18 | 21 |
| C30 | Coumarone-Indene | −16 | | | 19 | |
| Colophane | Pine rosin | 52 | | 12 | 19 | |
| Dertophene 1510 | Terpene Phenolic | 108 | | 23 | 31 | |
| Dertophene H150 | Terpene Phenolic | 74 | 4 | 16 | 38 | 34 |
| Dertophene T115 | Terpene Phenolic | 74 | | 16 | 18 | |

TABLE 1-continued

Change in Tg of BR at Various Epoxy Functionality Levels

| Plasticizer | | | Change in Tg of BR Mixture with 67 phr of Plasticizer, ° C. | | | |
|---|---|---|---|---|---|---|
| Name | Type | Tg, ° C. | 0 mol % X | 5 mol % X | 12.5 mol % X | 20 mol % X |
| Dertophene T135 | Terpene Phenolic | 85 | | | 23 | |
| Escorez 5690 | Cycloaliphatic | 38 | 14 | | | |
| Oppera | Hydrocarbon Resin | 44 | 12 | | 14 | 3 |
| Resin- OPFT | Octylphenol formaldehyde | 52 | | 9 | 17 | |
| Sylvares 600 | AMS phenolic | 47 | | | 20 | |
| Sylvares TP2019 | Terpene Phenolic | 74 | 12 | 19 | 17 | |
| Sylvares TP2040 | Terpene Phenolic | 74 | 4 | 15 | 36 | 36 |
| Sylvares TP300 | Terpene Phenolic | 68 | | | 35 | 32 |
| Sylvatac RE40 | Terpene Phenolic | −5 | | 10 | 15 | |
| Uni-Rez TP115 | polyamide | 64 | | 14 | 20 | |

For example, as may be seen in Table 1, the Oppera plasticizer (modified aliphatic hydrocarbon resin available from ExxonMobil) is demonstrated as an efficient resin only when mixed with the BR having 12.5 mol % epoxy functionality and not with the non-functionalized BR nor with the 20 mol % functionalization. BPH is the well-known antioxidant 2,2'-methylene-bis(4-methyl-6-tert-butyl)-phenol and is a useful efficient plasticizing resin at least for the BR having the 12.5 mol % epoxy functionality.

Other useful efficient plasticizing resins include the SYL-VARES 600 resin ($M_n$ 850 g/mol; Ip 1.4; $T_g$ 47° C.; HN of 31 mg KOH/g) that is an octyl phenol-modified copolymer of styrene and alpha methyl styrene as well as the coumarone-indene resins.

As may be noted, the terpene phenolic resins are especially useful as a class for providing efficient plasticizing resins. Terpene phenolic resins are well known and are produced by the copolymerization of terpene monomers and phenol. As is known, terpene monomers include alpha-pinene, beta-pinene and limonene monomers, with the limonene monomers existing in three possible isomers: L-limonene (laevorotatory enantiomer), D limonene (dextrorotatory enantiomer) or else dipentene, the racemate of the dextrorotatory and laevorotatory enantiomers. Useful terpene phenolic resins may be those that include the copolymerization of the monomers selected from alpha-pinene, beta-pinene, limonene monomers or combinations thereof with phenol. These types of resins are sometimes known as phenol modified terpene resins.

The degree of polarity of the terpene phenolic resins is determined by the number of hydroxyl groups contained within the resin. The higher the hydroxyl content, the greater the polarity of the terpene phenolic resin. The hydroxyl number of the resin is the amount, in milligrams, of potassium hydroxide equivalent to the hydroxyl groups in a 1 g sample of the resin and is, therefore, a measure of the concentration of hydroxyl groups in the resin. It is determined in known manner in accordance with ASTM E222. Particular embodiments have resins having a hydroxyl number that is at least 30 mg KOH/g or alternatively at least 50 mg KOH/g.

Terpene phenolic resins are available on the market from, for example, Arizona Chemical having offices in Savannah, Ga. Arizona Chemical markets a range of terpene phenolic resins under the name SYLVARES with varying softening points (SP), glass transition temperatures (Tg) hydroxyl numbers (HN), number-average molecular masses (Mn) and polydispersity indices (Ip), examples of which include: SYLVARES TP105 (SP: 105° C.; Tg: 55° C.; HN: 40; Mn: 540; Ip: 1.5); SYLVARES TP115 (SP: 115° C.; Tg: 55° C.; HN: 50; Mn: 530; Ip: 1.3); and SYLVARES TP2040 (SP: 125° C.; Tg: 80° C.; HN: 135-150; Mn: 600; Ip: 1.3).

Particular embodiments of the useful rubber compositions disclosed herein may include between 30 phr and 150 phr or 40 phr and 150 phr of the efficient plasticizing resin or alternatively between 50 phr and 150 phr or between 60 phr and 100 phr of the resin. In particular embodiments the amount of efficient plasticizing resin that is added is an amount that adjusts the glass transition temperature of the final rubber composition to between −35° C. and 0° C. as may be desired for the a tread designed for a particular season. For example the efficient resin may be added in an amount sufficient to adjust the Tg of the rubber compositions around the broad range mentioned above to provide a Tg of between −35° C. and −25° C. for winter tires, between −30° C. and −17° C. for all-season tires and between −17° C. and 0° C. for summer tires.

It is recognized that in some rubber compositions that include the eBR and/or the eSBR, the amount of the efficient resin added to the rubber composition may result in the Tg of the rubber composition being higher than the target for the particular use. Therefore, in particular embodiments, an additional plasticizer, such as a low Tg resin other than an efficient plasticizing resin may be used to lower the Tg to the target or to adjust another performance characteristic for the tread to be formed from the rubber composition. Such plasticizers may include other resins or may include a plasticizing oil as are well known to those having ordinary skill in the art. Such additional plasticizer may be added in an amount of between 0 phr and 60 phr or alternatively between 0 and 40 phr, between 1 phr and 30 phr or between 5 phr and 15 phr or 0 phr.

In addition to the elastomers, the efficient plasticizing resins and other plasticizers disclosed above, particular embodiments of the rubber compositions that are useful for treads disclosed herein may further include a reinforcing filler. Reinforcing fillers are added to rubber compositions to, inter alia, improve their tensile strength and wear resistance. Any suitable reinforcing filler may be suitable for use in compositions disclosed herein including, for example, carbon blacks and/or inorganic reinforcing fillers such as silica, with which a coupling agent is typically associated.

It should be noted that particular embodiments of the rubber compositions disclosed herein may include no carbon black or alternatively, very little carbon black such as, for example, between 0.5 phr and 15 phr of carbon black or between 0.5 phr and 10 phr of carbon black. For those embodiments that contain carbon black, suitable carbon blacks include, for example, those of the type HAF, ISAF and SAF, conventionally used in tires. Reinforcing blacks of ASTM grade series 100, 200 and/or 300 are suitable such as, for example, the blacks N115, N134, N234, N330, N339, N347, N375 or alternatively, depending on the intended application, blacks of higher ASTM grade series such as N660, N683 and N772.

Inorganic reinforcing fillers include any inorganic or mineral fillers, whatever its color or origin (natural or synthetic), that are capable without any other means, other than an intermediate coupling agent, of reinforcing a rubber composition intended for the manufacture of tires. Such inorganic reinforcing fillers can replace conventional tire-grade carbon blacks, in whole or in part, in a rubber composition intended for the manufacture of tires. Typically such fillers may be characterized as having the presence of hydroxyl (—OH) groups on its surface.

Inorganic reinforcing fillers may take many useful forms including, for example, as powder, microbeads, granules, balls and/or any other suitable form as well as mixtures thereof. Examples of suitable inorganic reinforcing fillers include mineral fillers of the siliceous type, such as silica ($SiO_2$), of the aluminous type, such as alumina ($AlO_3$) or combinations thereof.

Useful silica reinforcing fillers known in the art include fumed, precipitated and/or highly dispersible silica (known as "HD" silica). Examples of highly dispersible silicas include Ultrasil 7000 and Ultrasil 7005 from Degussa, the silicas Zeosil 1165MP, 1135MP and 1115MP from Rhodia, the silica Hi-Sil EZ150G from PPG and the silicas Zeopol 8715, 8745 and 8755 from Huber. In particular embodiments, the silica may have a BET surface area, for example, of between 60 $m^2/g$ and 400 $m^2/g$ or alternatively between 80 $m^2/g$ and 300 $m^2/g$.

For coupling the inorganic reinforcing filler to the diene elastomer, a coupling agent that is at least bifunctional provides a sufficient chemical and/or physical connection between the inorganic reinforcement filler and the diene elastomer. Examples of such coupling agents include bifunctional organosilanes or polyorganosiloxanes. Such coupling agents and their use are well known in the art. The coupling agent may optionally be grafted beforehand onto the diene elastomer or onto the inorganic reinforcing filler as is known. Otherwise it may be mixed into the rubber composition in its free or non-grafted state. One useful coupling agent is X50-S, a 50-50 blend by weight of Si69 (the active ingredient, bis-(triethoxysilylpropyl) tetrasulfide, abbreviated to TESPT) and N330 carbon black, available from Evonik. Another useful example of silane polysulfides useful as coupling agents include bis-(triethoxysilylpropyl) disulfide, abbreviated to TESPD.

In the rubber compositions according to the invention, the coupling agent may be included at any suitable amount for the given application, examples of which are between 2 phr and 20 phr or alternatively, between 2 phr and 15 phr or between 4 phr and 12 phr. It is generally desirable to minimize its use. In particular embodiments, the amount of coupling agent may represent between 0.5 and 15 wt. % relative to the total weight of the silica filler. In the case for example of tire treads for passenger vehicles, the coupling agent may be less than 12 wt. % or even less than 8 wt. % relative to the total weight of the silica filler.

In particular embodiments, the amount of total reinforcing filler (carbon black (if used) and/or reinforcing inorganic filler) may include any suitable amount for the given application, examples of which are between 40 phr and 180 phr or alternatively between 50 phr and 150 phr, between 50 phr and 130 phr, between 50 phr and 110 phr or between 60 phr and 120 phr of reinforcing filler.

The rubber compositions disclosed herein may be cured with any suitable curing system including a peroxide curing system or a sulfur curing system. Particular embodiments are cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.4 phr and 10 phr or alternatively between 0.4 phr and 5 phr or between 0.5 phr and 2 phr. Particular embodiments may include no free sulfur added in the curing system but instead include sulfur donors.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Particular embodiments may include as a secondary accelerant the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA).

Without limiting the invention, such accelerators may be added in an amount of up to 10 phr, between 0.5 and 5 phr, between 0.5 and 2.5 phr or between 1 and 4.5 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 0.5 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 110° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 15 minutes) and at a sufficiently low temperature lower than the vulcanization temperature of the mixture, so as to protect against premature vulcanization.

The rubber composition can be formed into useful articles, including treads for use on vehicle tires. Articles may be formed, for example, by extrusion or by placing the rubber in a mold and molding the rubber article. Tire treads may, for example, be formed by extrusion as tread bands or may be cured in a mold and then later made a part of a tire. Alternatively they be formed directly onto a tire carcass by, for example, extrusion and then cured in a mold.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the claimed invention.

Modulus of elongation (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Mooney viscosity (ML 1+4) was measured in accordance with ASTM Standard D1646-04. In general, the composition in an uncured state is molded in a cylindrical enclosure and heated to 100° C. After 1 minute of preheating, the rotor turns within the test sample at 2 rpm, and the torque used for maintaining this movement is measured after 4 minutes of rotation. The Mooney viscosity is expressed in "Mooney units" (MU, with 1 MU=0.83 Newton-meter).

Hysteresis losses (HL) were measured in percent by rebound at 60° C. at the sixth impact in accordance with the following equation:

$$HL(\%)=100(W_0-W_1)/W_1,$$

where $W_0$ is the energy supplied and $W_1$ is the energy restored.

Dynamic properties (Tg and G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −80° C. to 100° C. with the temperature increasing at a rate of 1.5° C./min. The shear modulus G* was captured at 60° C. and the temperature at which the max tan delta occurred was record as the glass transition temperature, Tg. The tan delta at 0° C. was also recorded as a useful predictor of wet traction with a higher tan delta at 0° C. measurement indicating an improved performance in traction performance.

The mole percent of the epoxide functional group was determined by NMR characterization. First a 25 mg sample of the epoxidized elastomer is dissolved in 1 mL of deuterated chloroform ($CDCl_3$). The NMR analyses were performed on a 500 MHz Bruker Spectrometer equipped with a 5 mm Broad Band Cryoprobe. The sequence used was a quantitative 30 degrees $^1H$ simple impulsion with a recycle delay of 5 seconds. The spectral width was 12 ppm and the number of scans was 64. Calibration was carried out at 7.20 ppm on the $CHCl_3$ signal. Acquisition parameters were adjusted to obtain a full spectrum without FID truncation.

The $^1H$ NMR Spectrum shows the characteristic signal of the CH=CH of BR1-4 ($\delta$=5.32 ppm) and the CH—CH of epoxidized BR1-4 ($\delta$=2.86 pm). A small signal at 2.63 ppm is also attributed to epoxidized BR. These attributions were confirmed by 2D NMR $^1H$-$^{13}C$ HSQC and HMBC.

The $^1H$ NMR spectrum makes it possible to quantify the functional group by integration of the signal characteristic of the protons of the epoxidized group situated in the vicinity of $\delta$=2.86 ppm. The $^1H$ NMR technique was used to determine the microstructure of the elastomers obtained.

The molar ratio was estimated with the ratio of each pattern on the total according to the following calculation:

$$\% \; Epox = \frac{1H(Epox)}{1H(Br1-4)+1H(Epox)}.$$

The macrostructure of the epoxidized BR was determined by Size Exclusion Chromatography (SEC) characterization. The polymer was solubilized in THF at a concentration of 1 g/l. A volume of 100 µl was injected after filtration over 0.45 µm filters, through a set of SEC columns («STYRAGEL HMW7», «STYRAGEL HMW6E» and 2 «STYRAGEL HT6E» columns, apparatus «WATERS alliance»). The mobile phase flow was 0.7 ml/min. The columns were thermostated in an oven at 35° C. The detection is made by a thermostated refractometer at 35° C. The stationary phase is constituted of a copolymer of polystyrene/divinylbenzene at a controlled porosity. The Moore calibration curve is previously made with polystyrene standards.

Tire wear was measured by running the tires on a predetermined circuit over a varying public road surfaces in the Greenville S.C. area. The tread depth was measured at the start and was measured again after the same number of miles for the tires being compared, typically between 5000 miles and 8000 miles. The difference between the tread depths was the measurement of the wear.

Example 1

Rubber compositions were prepared using the components shown in Table 2. The amount of each component making up the rubber compositions shown in Table 2 are provided in parts per hundred parts of rubber by weight (phr). The percent epoxidation of the rubber component is also shown in Table 2 as either 5 mol % or 12.5 mol %.

The silica was Sil160 from Rhodia. The C30 was NOVARES C30 (coumarone-indene resin; softening point: 20 to 30° C.) from Rutgers Chemicals. Dertophene H150 was a terpene phenolic resin from DRT having a softening point of 118° C. and hydroxyl value of between 156-170 and an Mn of 579 and an Ip of 1.18. The SYLVARES TP2040 was a terpene phenolic resin with a softening point of 125° C., a Tg of 74° C., a hydroxyl value of between 141-160, an Mn of 608 and an Ip of 1.3. The SYLVARES TP2019 was a terpene phenolic resin with a softening point of 125° C., a Tg of 73° C., a hydroxyl value of between 70 and 80, an Mn of 657 g/mol and an Ip of 1.34.

The HTO was the sunflower oil AGRI-PURE 80 having a high oleic acid content of between 70 wt % and 80 wt %, available from Cargill.

The rubber formulations were prepared by mixing the components given in Table 2, except for the accelerators and sulfur, in a Banbury mixer until a temperature of between 110° C. and 190° C. was reached. The accelerators and sulfur were added in the second phase on a mill. Vulcanization was effected at 150° C. for 40 minutes. The formulations were then tested to measure their properties, the results of which are shown in Table 2.

TABLE 2

Formulations and Properties

| Formulations | F1 | F2 | F3 | F4 | F5 |
|---|---|---|---|---|---|
| eBR 5 mol % | 100 | | | 100 | |
| eBR 12.5 mol % | | 100 | 100 | | 100 |
| N234 | 6.56 | 8.56 | 8.56 | 97 | 97 |
| Sil160 | 104 | 100 | 100 | | |
| Si69 coupling agent | 8.32 | 8 | 8 | | |
| C30 | 22 | | | 4 | 16 |
| TP2040 | 51 | | 63 | | |
| Dertophene H150 | | 73 | | | |
| TP2019 | | | | 64 | 67 |
| HTO | | | 10 | | |
| 6PPD | 2 | 1.9 | 1.9 | 2 | 2 |
| Wax | 1.5 | 1.5 | 1.5 | 1.5 | 1.5 |
| DPG | 1.7 | 1.7 | 1.7 | | |
| SAD | 2 | 2 | 2 | 2 | 2 |
| ZnO | 1.5 | 1.5 | 1.5 | 1.5 | 1.5 |
| CBS | 3.86 | 3.86 | 3.86 | 1.5 | 1.5 |
| S | 0.83 | 0.83 | 0.83 | 1.5 | 1.5 |
| Physical Properties | | | | | |
| Tg, ° C. | −19 | −8 | −22 | −25 | −21 |
| G* at 60° C. | 1.1 | 1.8 | 2.3 | 1.1 | 1.4 |

Example 2

This example provides a procedure for making epoxidized BR. A solution of BR at 5 wt % in toluene was prepared by dissolving 8.4 kg of BR in 175.3 L of toluene. 809.8 g of formic acid (purity>98%) was added in the reactor under a sustained stirring. The reactor was then heated up to 50° C. After the temperature was reached, 2.12 L of $H_2O_2$ solution (solution at 35 wt % in water) was added to the reaction mixture. The temperature was kept at 50° C. during 4 hours at a stirring of 200 RPM.

At the end of the reaction, the temperature was decreased to 30° C. Then, formic acid was neutralized with a NaOH solution at 2.5M (1.01 eq) to obtain a pH of around 10. The contact time for the neutralization was at least 30 minutes.

Antioxidants (4,4'-methylene-bis-2,6-tert-butylphénol/N-(1,3-dimethylbutyl)-N'-phenyl-p-phenylenediamine: 1/1) are were added to the epoxidized BR solution at a rate of 0.5 g for 100 g of elastomer. The contact time was at least 15 minutes. After, the epoxidized BR solution was stripped and dried.

The epoxide quantity, as obtained by NMR as described above, is 12.5 mol %+/−0.5 mol %. The yield of the chemical modification is 95 wt %. The macrostructure of the epoxidized BR is the following: Mn=232940 g/mol; Mw=533348 g/mol and Ip=2.29 as determined by SEC as described above.

Example 3

This example provides a demonstration of the improved wear that may be obtained in an example of the rubber compositions disclosed herein. Rubber compositions were prepared using the components shown in Table 3. The amount of each component making up the rubber compositions shown in Table 3 are provided in parts per hundred parts of rubber by weight (phr). The eBR was had a epoxide content of 12.5 mol %.

The silica was a 50-50 mix of Solvay ZEOSIL 1165, a micoperle silica having a BET of 160 m$^2$/g and a CTAB of 157 m$^2$/g and Evonik ULTRASIL 7000, a granuele silica having a BET of 175 m$^2$/g and a CTAB of 160 m$^2$/g. The low Tg resin was NOVARES C30 (coumarone-indene resin; softening point: 20 to 30° C.; Tg: −16° C.) from Rutgers Chemicals.

The high Tg resin used in the F6 formulation was SYLVARES TP115, a terpene phenolic resin with a softening point of 115° C., a Tg of 60° C., a hydroxyl value of between 25 and 35, an Mn of 575 g/mol and an Ip of 1.3. The high Tg resin used in the W1 formulation was ESCOREZ 5600, a aromatic modified, cycloaliphatic hydrocarbon resin with a softening point of 103° C., a Tg of 55° C. and an Mn of 500 g/mol.

The HTO was the sunflower oil AGRI-PURE 80 having a high oleic acid content of between 70 wt % and 80 wt %, available from Cargill. The cure and antidegradant packages contained the typical components such as sulfur, accelerators, zinc oxide, stearic acid, 6ppd and so forth. The silol coupling agent was bis(3-hydroxydimethylsilyl)propyl tetrasulfide that is known and its various forms and methods of making are fully disclosed in U.S. Pat. No. 6,774,255.

The rubber formulations were prepared by mixing the components given in Table 2, except for the accelerators and sulfur, in a Banbury mixer until a temperature of between 110° C. and 190° C. was reached. The accelerators and sulfur were added in the second phase on a mill. Vulcanization was effected at 150° C. for 40 minutes. The formulations were then tested to measure their properties, the results of which are shown in Table 2.

TABLE 3

| Formulations | W1 | F6 |
|---|---|---|
| SBR | 100 | |
| eBR 12.5 mol % | | 100 |
| Carbon Black N234 | 4 | 4 |
| Sil160/165 | 110 | 110 |
| Si69 coupling agent | 11 | |
| Silol coupling agent | | 7.4 |
| High Tg Resin | 60 | 76 |
| Low Tg Resin | | 3 |
| HTO | 12 | 0 |
| Antidegradants Pkg | 8 | 8 |
| Cure Pkg | 9.5 | 11 |
| Physical Properties | | |
| Tg, ° C. | −15 | −13 |
| G* at 60° C. | 1.0 | 0.9 |
| G* 10% | 2.0 | 1.9 |
| Tire Results | | |
| Wear | 100 | 119 |

As can be seen in tire results, the wear improved significantly between the tires having treads with the W1 rubber composition and the inventive F6 rubber composition.

Example 4

Rubber compositions were prepared using the components shown in Tables 4. The amount of each component making up the rubber compositions shown in Tables 4 are provided in parts per hundred parts of rubber by weight (phr). The percent epoxidation of the rubber component is also shown in Table 4 as either 5 mol % or 12.5 mol %.

The silica was Sil160 from Rhodia. The resins included C30, Oppera and TP2019. The C30 was a low-Tg resin NOVARES C30 (coumarone-indene resin; softening point: 20 to 30° C.; Tg: −16° C.) from Rutgers Chemicals. The SYLVARES TP2019 was a terpene phenolic resin with a softening point of 125° C., a Tg of 73° C., a hydroxyl value of between 70 and 80, an Mn of 657 g/mol and an Ip of 1.34. The Oppera from ExxonMobil was a dicyclopentadiene based resin with a softening point of 103° C., a Tg of 45° C. a hydroxyul value of 0 and an Mn of 480 g/mole. The HTO was the sunflower oil AGRI-PURE 80 having a high oleic acid content of between 70 wt % and 80 wt %, available from Cargill.

The rubber formulations were prepared by mixing the components given in Table 3, except for the accelerators and sulfur, in a Banbury mixer until a temperature of between 110° C. and 190° C. was reached. The accelerators and sulfur were added in the second phase on a mill. Vulcanization was effected at 150° C. for 40 minutes. The formulations were then tested to measure their properties, the results of which are shown in Table 3.

Tires were also manufactured using the formulations below and tested for wear. The wear properties of the tires are shown in Table 3.

TABLE 4

Formulations and Properties

| Formulations | W2 | F7 | F8A | F8B |
|---|---|---|---|---|
| BR | 43 | | 30 | |
| SBR | 57 | | | 30 |
| eBR 5 mol % | | 100 | 70 | 70 |
| Carbon Black N234 | 7 | 7 | 7 | 7 |
| Sil160 | 104 | 104 | 104 | 104 |
| Si69 coupling agent | 8 | 8 | 8 | 8 |
| High Tg Resin | 41 | 68 | 64 | 33 |
| Low Tg Resin | | 10 | 15 | 42 |
| HTO | 16 | 0 | 0 | 0 |
| Antidegradants Pkg | 5 | 3.5 | 3.5 | 3.5 |
| Cure Pkg | 8.5 | 10 | 10 | 10 |
| Physical Properties | | | | |
| Tg, ° C. | −22 | −22 | −20 | −24 |
| G* at 60° C. | 1.1 | 1.0 | 1.1 | 2 |
| G* 10% | 2.3 | 2.1 | 2.2 | 1 |
| Tire Properties | | | | |
| Wear | 100 | 107 | 109 | 107 |

As may be seen in the results, the wear of tires made with both F7 and F8A, B improved significantly over the witness tire that had no epoxidized rubber component and, when BR was added in F8A, there was a slight improvement in wear and even more surprisingly, when the SBR was added in F8B, there was no significant decrease in wear which would have been expected.

Example 5

This example illustrates the surprising effect of adding BR to a rubber composition having epoxidized BR or epoxidized SBR included. Rubber compositions were prepared using the components shown in Table 5. The amount of each component making up the rubber compositions shown in Table 5 are provided in parts per hundred parts of rubber by weight (phr).

Table 6 and Table 7 provide the makeup of the rubber compositions expressed as 100 phr in Table 5. The rubber compositions were prepared similarly to those in the examples above and then tested to measure their properties, the results of which are shown in Table 6 and in Table 7. The SBR used in the rubber compositions of Table 6 was an SBR functionalized at the chain end with a silanol functional unit with 27% styrene and a Tg of −48° C.

The SYLVARES TP115 was a terpene phenolic resin with a softening point of 115° C., a Tg of 60° C., a hydroxyl value of between 25 and 35, an Mn of 575 g/mol and an Ip of 1.3. The SYLVARES TP2019 was a terpene phenolic resin with a softening point of 125° C., a Tg of 73° C., a hydroxyl value of between 70 and 80, an Mn of 657 g/mol and an Ip of 1.34.

TABLE 5

Base Rubber Composition

| Formulations | Base |
|---|---|
| Rubber* | 100 |
| Carbon Black | 7 |
| Sil160 | 104 |
| Si69 coupling agent | 8.3 |
| Resin* | 73/80 |
| Antidegradants Pkg | 3.5 |
| Cure Pkg | 16 |

*See Table 5

TABLE 6

Rubber Formulations Properties 5% eBR

| | F9 | F10 | F11 | F12 | F13 | F14 | F15 | F16 |
|---|---|---|---|---|---|---|---|---|
| Formulations | | | | | | | | |
| eBR 5 mol % | 100 | 67 | 50 | 33 | 100 | 67 | 50 | 33 |
| BR | 0 | 33 | 50 | 67 | 0 | 0 | 0 | 0 |
| SBR | 0 | 0 | 0 | 0 | 0 | 33 | 50 | 67 |
| TP Resin TP2019 | 73 | 73 | 73 | 73 | 73 | 73 | 73 | 73 |
| Physical Properties | | | | | | | | |
| Tg, ° C. | −17 | −4 | 2 | 5 | −30 | −5 | 4 | 10 |
| Tan Delta at 0° C. | 0.57 | 0.68 | 0.73 | 0.71 | 0.38 | 0.76 | 0.83 | 0.76 |

TABLE 7

Rubber Formulations Properties 12.5% eBR

| | F17 | F18 | F19 | F20 | F21 | F22 | F23 |
|---|---|---|---|---|---|---|---|
| Formulations | | | | | | | |
| eBR 12.5 mol % | 100 | 67 | 50 | 33 | 25 | 15 | 7 |
| BR | 0 | 33 | 50 | 67 | 75 | 85 | 93 |
| TP Resin TP115 | 80 | 80 | 80 | 80 | 80 | 80 | 80 |
| Physical Properties | | | | | | | |
| Tg, ° C. | −18 | −10 | −4 | 2 | 8 | 10 | 0 |
| Tan Delta at 0° C. | 0.52 | 0.72 | 0.78 | 0.72 | 0.67 | 0.6 | 0.6 |

As may be seen from the results from Table 6, the addition of either BR or SBR to the rubber composition that included the epoxidized BR and the efficient plasticizing resin surprisingly provided a higher Tg of the rubber composition and provided a higher tan delta at 0° C., which indicates an improved wet traction performance. Note that in the results shown in both Table 6 and Table 7 that the tan delta at 0° C. reached a maximum somewhere around 50 phr of BR or SBR being added to the rubber composition.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A rubber composition that is based upon a cross-linkable elastomer composition, the cross-linkable elastomer composition comprising, per 100 parts by weight of rubber (phr):
   a rubber component that is a modified rubber component selected from the group consisting of a modified polybutadiene rubber, a modified styrene-butadiene rubber and combinations thereof, wherein the modified rubber component has been modified with a functional group having a hydrogen bond acceptor atom, the functional group selected from the group consisting of a pyridine, a pyrrolidone, an ether, a ketone, a sulfone and an epoxide and wherein the modified rubber component has a Tg of between −80° C. and −110° C., wherein the hydrogen bond acceptor atom is located at least two covalent bond lengths from a backbone of the modified rubber component;
   between 30 phr and 130 phr of an efficient plasticizing resin, wherein the efficient plasticizing resin is, when included in a mixture consisting of the modified rubber component and 67 phr of the efficient plasticizing resin, causes a Tg of the mixture to be at least 14° C. higher than the Tg of the modified rubber component and wherein the efficient plasticizing resin has a hydrogen bond donor group;
   a reinforcement filler; and
   a curing system.

2. The rubber composition of claim 1, wherein the functional group selected from the group consisting of a pyridine, a pyrrolidone, a cyclic ether and a cyclic ketone.

3. The rubber composition of claim 1, wherein the functional group is selected from the group consisting of a non-cyclic ketone and a sulfone.

4. The rubber composition of claim 1, wherein the hydrogen bond acceptor atom is located at least three covalent bond lengths from the backbone of the modified rubber component.

5. The rubber composition of claim 1, wherein the functional group is an epoxide.

6. The rubber composition of claim 1, wherein the functional group content of the modified rubber component is between 3 mol % and 18 mol %.

7. The rubber composition of claim 1, wherein the modified rubber component is the modified styrene-butadiene rubber.

8. The rubber composition of claim 1, wherein the rubber composition further comprises between 0 phr and 30 phr of a second rubber component that is a highly unsaturated diene elastomer.

9. The rubber composition of claim 8, wherein the second rubber component is selected from the group consisting of a polybutadiene rubber (BR), a styrene-butadiene rubber (SBR) and combinations thereof.

10. The rubber composition of claim 1, wherein the amount of the modified rubber component is between 10 phr and 95 phr.

11. The rubber composition of claim 9, wherein the second rubber component is BR.

12. The rubber composition of claim 1, wherein a Tg of the rubber composition is between −35° C. and 0° C.

13. The rubber composition of claim 1, wherein the efficient plasticizing resin is a terpene phenolic resin.

14. The rubber composition of claim 1, wherein the efficient plasticizing resin is a coumarone-indene resin.

15. A tire tread, comprising at least in part the rubber composition of claim 1.

16. A rubber composition that is based upon a cross-linkable elastomer composition, the cross-linkable elastomer composition comprising, per 100 parts by weight of rubber (phr):
    a rubber component that is a modified rubber component selected from the group consisting of a modified polybutadiene rubber, a modified styrene-butadiene rubber and combinations thereof, wherein the modified rubber component has been modified with a functional group having a hydrogen bond acceptor atom, the functional group selected from the group consisting of a non-cyclic ketone, a sulfone and combinations thereof and wherein the modified rubber component has a Tg of between −80° C. and −110° C.;
    between 30 phr and 130 phr of an efficient plasticizing resin, wherein the efficient plasticizing resin is, when included in a mixture consisting of the modified rubber component and 67 phr of the efficient plasticizing resin, causes a Tg of the mixture to be at least 14° C. higher than the Tg of the modified rubber component and wherein the efficient plasticizing resin has a hydrogen bond donor group;
    a reinforcement filler; and
    a curing system.

17. The rubber composition of claim 16, wherein the hydrogen bond acceptor atom is located at least two covalent bond lengths from a backbone of the modified rubber component.

18. The rubber composition of claim 16, wherein the functional group content of the modified rubber component is between 3 mol % and 18 mol %.

19. The rubber composition of claim 16, wherein the rubber composition further comprises between 0 phr and 30 phr of a second rubber component that is a highly unsaturated diene elastomer.

20. The rubber composition of claim 19, wherein the second rubber component is selected from the group consisting of a polybutadiene rubber (BR), a styrene-butadiene rubber (SBR) and combinations thereof.

21. A tire tread, comprising at least in part the rubber composition of claim 16.

* * * * *